United States Patent [19]

Hodgson

[11] 4,079,892

[45] Mar. 21, 1978

[54] LIQUID MANURE SPREADER

[75] Inventor: James H. Hodgson, Vinton, Iowa

[73] Assignee: Chromalloy American Corporation, New York, N.Y.

[21] Appl. No.: 709,663

[22] Filed: Jul. 29, 1976

[51] Int. Cl.² .............................................. A01G 25/09
[52] U.S. Cl. .................................................... 239/172
[58] Field of Search .............. 239/172, 148, 651, 662; 220/85 F, 86 R; 214/35 R, 16 R; 137/512, 527, 527.6, 590

[56] References Cited

U.S. PATENT DOCUMENTS

| 1,708,907 | 4/1929 | Spencer | 137/527 X |
| 3,294,407 | 12/1966 | Vander Pol | 239/148 |
| 3,358,059 | 12/1967 | Snyder | 220/86 R |
| 3,415,504 | 12/1968 | Smith et al. | 214/35 X |
| 3,980,236 | 9/1976 | Richardson | 239/172 |

Primary Examiner—John J. Love
Attorney, Agent, or Firm—Wegner, Stellman, McCord, Wiles & Wood

[57] ABSTRACT

A liquid manure spreader has a tank, and a filler opening in the top of the tank is defined by two parallel sidewalls and two connecting walls which extend a substantial distance into the tank. A pair of opposed filler doors are pivoted on the parallel sidewalls a substantial distance below the tops of the walls and are lightly biased to transverse positions in which they abut substantially on the median plane between the sidewalls to close the filler opening. The biasing is light enough that the doors swing downwardly to an open position when liquid is discharged onto them from a filler hose.

2 Claims, 3 Drawing Figures

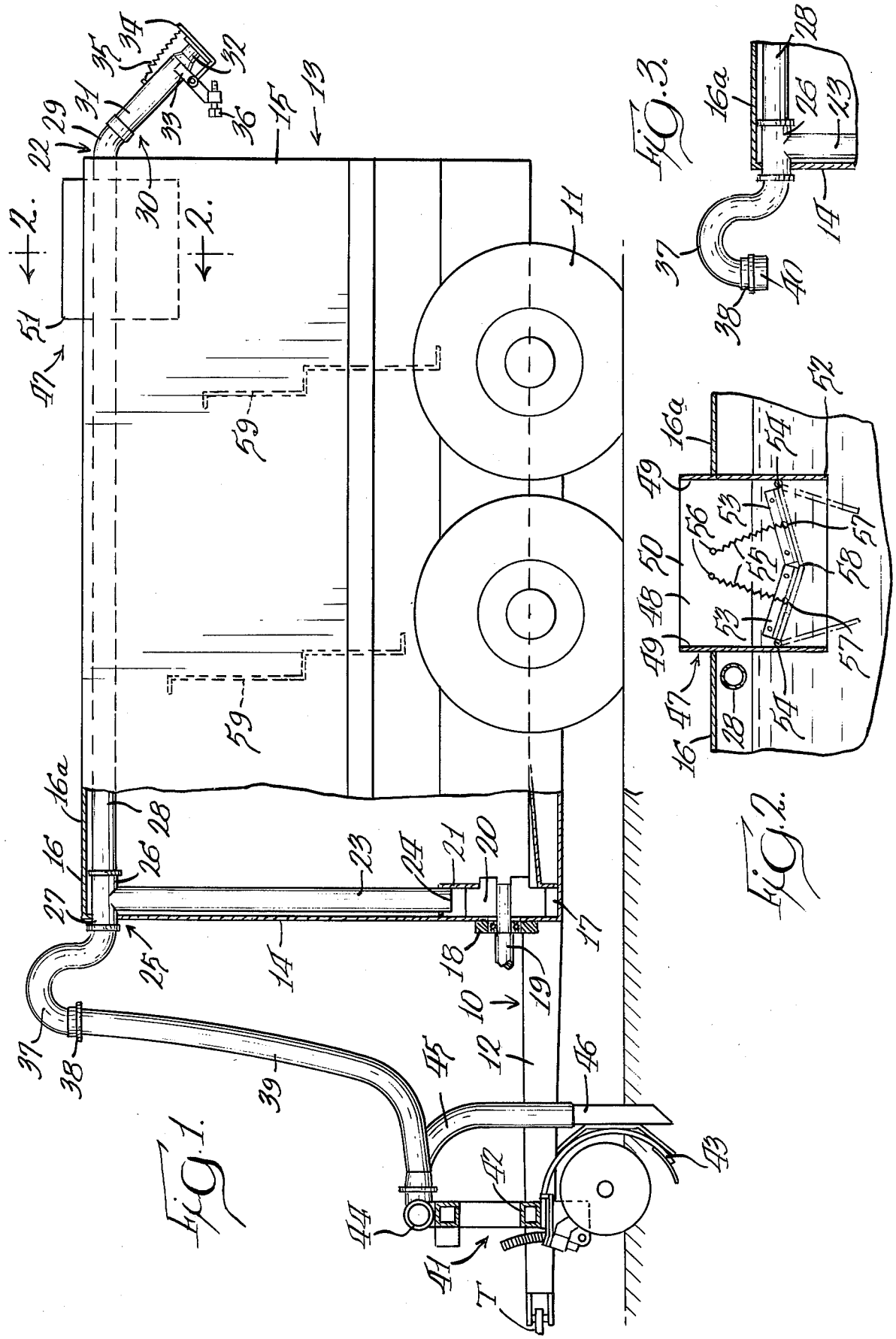

4,079,892

LIQUID MANURE SPREADER

CROSS-REFERENCE TO RELATED APPLICATION

Parts of the structure disclosed but not claimed in this application are disclosed and claimed in applicant's copending application for U.S. patent Ser. No. 709,662, filed July 29, 1976.

BACKGROUND OF THE INVENTION

Some relatively recent developments in farming practices have created a need for devices which are capable of handling a large quantity of liquid manure which may vary from a liquid containing relatively small amounts of suspended solid to a fairly thick slurry. In large cattle operations it has been found convenient and very effective to blend manure and urine removed from the cattle holding areas with wash water and additional water to create a slurry which is stored in large holding tanks with agitators to prevent the solids from settling to the bottom of the tank as a sludge. The slurry may then be pumped from the holding tank into a mobile tank from which it may be discharged either through a nozzle or through injectors which leave it in the soil below ground level.

There is a great need for simple, rugged, high capacity slurry spreaders for use in modern large scale farming operations.

SUMMARY OF THE INVENTION

The principal object of the present invention is to provide a large capacity, tank type slurry spreader which possesses structural and operational advantages not found in the prior art.

Another object of the invention is to provide a liquid manure spreader which has a unique filler system with spring loaded doors which open automatically under pressure of liquid manure being delivered to the apparatus, and which close automatically upon shutoff.

THE DRAWINGS

FIG. 1 is a side elevational view, partly in section, of the device of the invention showing its relationship to a liquid manure injector mounted on the three point hitch of a tractor to which the apparatus of the invention is hitched for towing;

FIG. 2 is a fragmentary sectional view on an enlarged scale taken substantially as indicated along the line 2—2 of FIG. 1; and FIG. 3 is a fragmentary sectional view of the front upper portion of FIG. 1, showing the discharge piping disconnected from the liquid manure injector and plugged for spray discharge.

DETAILED DESCRIPTION OF THE INVENTION

Referring to the drawings in detail, the apparatus of the present invention consists of a chassis, indicated generally at 10, which is carried upon dual wheels 11 and has a draft tongue 12 for connection to a tractor draw bar T. Mounted upon the chassis 10 is a cylindrical tank 13. In a commercial structure embodying the invention the tank 13 has a capacity of nearly 3300 gallons of liquid, which is a load substantially in excess of 13 tons.

The tank 13 has a front wall 14, a back wall 15, and a cylindrical sidewall 16 which is welded to the front and back walls 14 and 15. At the front of the tank is a sump 17.

Near the bottom of the tank front wall 14 is a sealed bearing 18 in which a shaft 19 is journalled, and keyed to the rear of the shaft immediately inside the front wall 14 is a combined impeller and agitator pump 20 which is carried in a pump casing 21 and has its lower portion in the sump 17. The shaft 19 is adapted for attachment to a tractor power takeoff in the usual manner.

A discharge pipe, indicated generally at 22, includes a vertical run 23 which has its lower end 24 in the top of the pump casing 21; a tee 25 at the upper end of the vertical run 23 immediately beneath the upper extremity 16a of the tank, said tee having a first branch 26 that extends rearwardly and a second branch 27 that extends through an opening in the front wall 14 of the tank and is sealed in said opening; and a horizontal run 28 which extends rearwardly from the first branch 26 of the tee and has its rearward portion 29 extending through and sealed in an opening in the rear wall 15 of the tank. A nozzle assembly, indicated generally at 30, is mounted on the rear extremity of the projecting end portion 29 of the horizontal run 28.

The nozzle assembly 30 includes a tubular body 31 with a restricted end portion 32, and a bracket 33 upon which a nozzle closure 34 is pivotally mounted. A tension spring 35 normally retains the nozzle closure 34 in the closed position seen in FIG. 1 where it seals the open end of the nozzle assembly tubular body 31, and the tension on the spring 35 is such that the pressure of liquid driven by the impeller 20 swings the nozzle closure 34 downwardly and outwardly to a spreading position in which the closure plate 34 acts as a spray plate to spread the discharging liquid in a fan-like pattern about the nozzle. An adjustable stop 36 on the bracket 33 determines the extent to which the nozzle closure plate 34 may be opened under pressure.

Connected to the second branch 27 of the tee 25 is a gooseneck 37 at the free end of which is a fitting 38 which is internally threaded to selectively receive either a delivery hose 39 or a threaded plug cap 40 (FIG. 3). The delivery hose 39 serves an injector, indicated generally at 41, which is carried upon the three point hitch (not shown) of the tractor T. The injector constitutes no part of the present invention, and thus is described only broadly as including a transverse tool bar 42 for a plurality of laterally spaced chisels 43, a transverse manifold 44 supported upon a frame at the top of the tool bar to receive liquid manure from the hose 39, and a set of delivery hoses 45 and injector nozzles 46 which are aligned with the chisels 43.

At the rear upper portion of the tank 13 is a filler structure, indicated generally at 47, which is mounted in the top portion 16a of the cylindrical tank wall 16, and which consists of a filler opening 48 defined by two parallel sidewalls 49 and two parallel connecting walls of which only one wall 50 is seen in FIG. 2. The walls 49 and 50 defining the filler opening are seen to have an upper portion 51 projecting above the cylindrical tank wall 16, and a lower portion 52 which extends a substantial distance into the upper portion of the tank.

A pair of opposed filler doors 53 are pivotally mounted at 54 upon the parallel sidewalls 49, and tension springs 55 have their upper ends anchored at 56 on the connecting walls 50 and have their lower ends connected at 57 to the opposed filler doors 53. The springs 55 bias the filler doors 53 lightly to the closed position of FIG. 2 in which their free edges 58 abut when the filler doors are in a downwardly inclined position; and the tension of the springs 55 is such that the pressure of liquid being delivered to the filler opening 48 swings the filler doors 53 downwardly for substantially splash free filling of the tank 13. When the liquid pressure is cut off, the springs 55 automatically return the filler doors 53 to the closed position seen in FIG. 2, and the doors prevent splashing of liquid manure when the apparatus is in motion.

Within the tank 13 are baffles 59 which control sloshing of liquid in the tank when the apparatus is moving, and which also provide rigidity for the tank structure.

The foregoing detailed description is given for clearness of understanding only and no unnecessary limitations should be understood therefrom as modifications will be obvious to those skilled in the art.

I claim:

1. In a liquid manure spreader of the type which has a wheeled chassis with an enclosed tank mounted thereon, means for delivering liquid manure from the tank through spray nozzle means, a filler opening in the top of the tank which is defined by parallel, straight, upright sidewalls and connecting wall means connecting said sidewalls, said sidewalls and connecting wall means being mounted in an opening in the top of the tank and having an open upper end above the top of the tank and an open lower end a substantial distance within the tank, the improvement comprising:

a pair of opposed filler doors pivoted on said parallel sidewalls between the open lower end and the top of the tank, said filler doors being movable between slightly downwardly inclined transverse positions in which they abut substantially on the median plane between the parallel sidewalls so as to block the filler opening, and depending filling positions;

and biasing springs lightly urging both filler doors toward said transverse positions, the force of said springs being insufficient to maintain said doors in their transverse positions when liquid is discharged onto the tops of said doors by a filler hose, whereby said filler doors are self-opening when filling of the tank is started and self-closing when filling is stopped.

2. The improvement of claim 1 in which each of the biasing springs consists of a tension spring connected to the top of each filler door and to a wall of the connecting wall means.

* * * * *